Dec. 21, 1937.　　　J. R. CATALINA　　　2,102,835
AUXILIARY WHEEL
Filed May 13, 1937
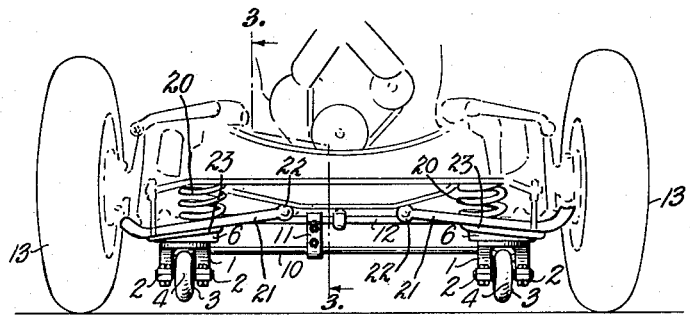
Fig. 1.
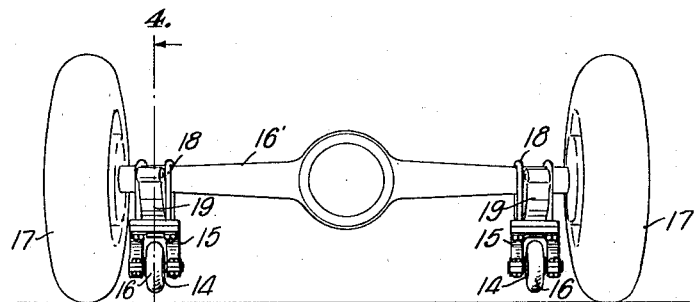
Fig. 2.
Fig. 3.
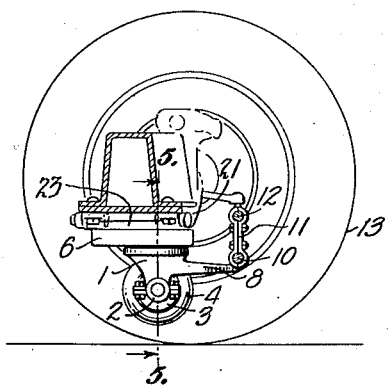
Fig. 4.
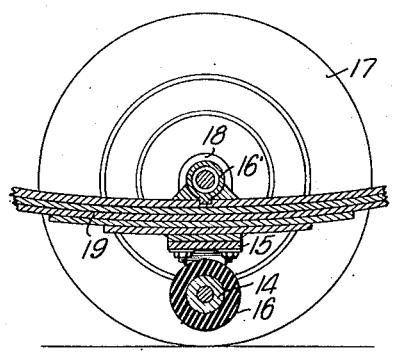
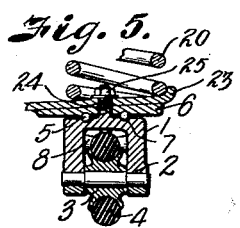
Fig. 5.
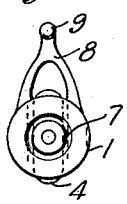
Fig. 6.
INVENTOR
James R. Catalina
BY
ATTORNEY Patented Dec. 21, 1937

2,102,835

UNITED STATES PATENT OFFICE 2,102,835

AUXILIARY WHEEL

James R. Catalina, Kansas City, Mo.

Application May 13, 1937, Serial No. 142,356

1 Claim. (Cl. 280—150)

My invention relates to auxiliary wheels for automotive vehicles and more particularly to a safety appliance for automobiles.

The high speeds at which modern automotive vehicle travel make the safety of the passengers depend upon the tires to a large extent. Serious and sometimes fatal accidents frequently occur if, when traveling at a high speed, a blowout is experienced, causing swerving of the car either into a passing vehicle or over an embankment or into an obstruction.

One object of my invention is to provide an auxiliary or emergency wheel in addition to the usual wheels of an automotive vehicle so that, in event of a blowout, accidents will be avoided.

Another object of my invention is to provide an auxiliary wheel which, in event of a puncture or deflation of a tire will permit the vehicle to be driven to a service station so that the driver of the car will not be stranded, necessitating the changing of the tire or wheel on the road.

Another object of my invention is to provide auxiliary wheels for automotive vehicles in such a manner that the overall width of the automobile is not increased.

Other and further objects of my invention will appear from the following description.

In general, my invention contemplates the application of auxiliary wheels to an automotive vehicle in such a manner that the original service wheels will not be interfered with, while the auxiliary wheels will be ready for service in event of deflation of the tire of one of the regular wheels of the automotive vehicle.

In the accompanying drawing which forms part of the instant specification and is to be read in conjunction therewith, and in which like reference numerals are used to indicate like parts in the various views;

Figure 1 is an elevation of the front axle of an automotive vehicle equipped with auxiliary wheels in combination with a knee-action suspension according to my invention.

Figure 2 is an elevation of the rear axle of an automotive vehicle equipped with auxiliary wheels according to my invention.

Figure 3 is a sectional view taken on a line 3—3 of Figure 1.

Figure 4 is a sectional view taken on a line 4—4 of Figure 2.

Figure 5 is a sectional view taken on a line 5—5 of Figure 3.

Figure 6 is a plan view of a detail.

More particularly referring now to the drawing, a pair of bearing supporting members 1 are secured to the front axle of an automotive vehicle in any suitable manner inboard of the front wheels 13. The bearing supporting members 1 are provided with bearings 2 which support small auxiliary wheels 3 provided with solid rubber tires 4. The bearing supporting members 1 are pivotally mounted upon ball bearings 5 adapted to run in a thrust plate 6 and a race 7 provided in the bearing supporting member 1. The spring 20 of the knee-action takes the thrust through lower knee-action arm 21. These arms are pivoted at 22 and are formed with a thrust plate 23 to which the bearing members 1 are pivotally secured by means of a bolt extension 24 and a nut 25. Each of the bearing supporting members 1 is provided with an arm 8 secured in any suitable manner as, for example, by means of knuckle 9, to a tie rod 10. The tie rod 10 is secured by means of a coupling member 11 to the steering tie rod 12 of the automobile. Inasmuch as the bearing supporting members 1 are pivotally mounted, as can readily be seen by reference to Figure 5, and are secured to a tie rod 10, it will be obvious that, when the wheels 13 are turned by means of the steering mechanism of the automobile, that the auxiliary wheels 3 will follow the movements of the front wheels 13. The clearance of the auxiliary wheels is such that normally, when the tires of the front wheels 13 are properly inflated, they will be off the ground a sufficient distance to allow for movement of the springs. If, however, the front wheels become deflated or either of them, the auxiliary wheel will bear the load and permit the vehicle to be driven to the next filling station to permit the repair of the tire.

The rear auxiliary wheels 14 are similar in construction to the front auxiliary wheels and are mounted upon similar wheel supporting members 15 and likewise provided with solid rubber tires 16. The rear auxiliary wheel supporting members 15 are secured to the rear axle 16' inboard of the rear wheels 17 by means of U-bolts 18 in the vicinity and bearing upon the rear springs 19. It will be obvious that the construction is such that, should the tires of the rear wheels 17 become deflated, the weight of the vehicle will be borne upon the auxiliary wheels 14 through the rear springs 19, as will be readily seen by reference to Figure 4.

I am aware that the art of providing an auxiliary wheel either secured to the main wheel or co-axial with its axle, is old. The disadvantages of the prior art, however, have been to increase the width of the vehicle, giving it a greater projected area on the road and involving changes in the design of the axle. My construction is such that it can be applied to any vehicle without involving a change in its design in such a manner that it will not increase its width.

My construction is a simple, inexpensive one which will contribute to the safety of automobile vehicles in general.

It will be observed that I have accomplished the objects of my invention and that I have provided an auxiliary wheel which will enable a vehicle to be driven upon the failure of any one or several of the tires of an automobile.

Having thus described my invention, what I claim is:

In an automotive vehicle having pneumatic tired front wheels, a knee-action assembly for supporting said front wheels, said knee-action including a pair of springs and a pair of pivoted knee-action arms, auxiliary wheels of smaller diameter than said vehicle wheels, means for pivotally mounting said auxiliary wheels on said knee-action arms at points closer to the longitudinal center line of the vehicle than said vehicle wheels and on axes below the axes of said vehicle wheels, said auxiliary wheels being supported with their peripheries clear of the ground but sufficiently close thereto that, upon deflation of the tires of said vehicle wheels, said auxiliary wheels will contact the ground to support said vehicle through said knee-action assembly, means on said vehicle for pivoting said front vehicle wheels to steer said vehicle, a tie rod for interconnecting said front auxiliary wheels, a link for connecting said tie rod with said means for pivoting said front vehicle wheels whereby, when said front auxiliary wheels or either of them is supporting a portion of the weight of said vehicle, said vehicle may be steered by the steering means for said front vehicle wheels.

JAMES R. CATALINA.